UNITED STATES PATENT OFFICE.

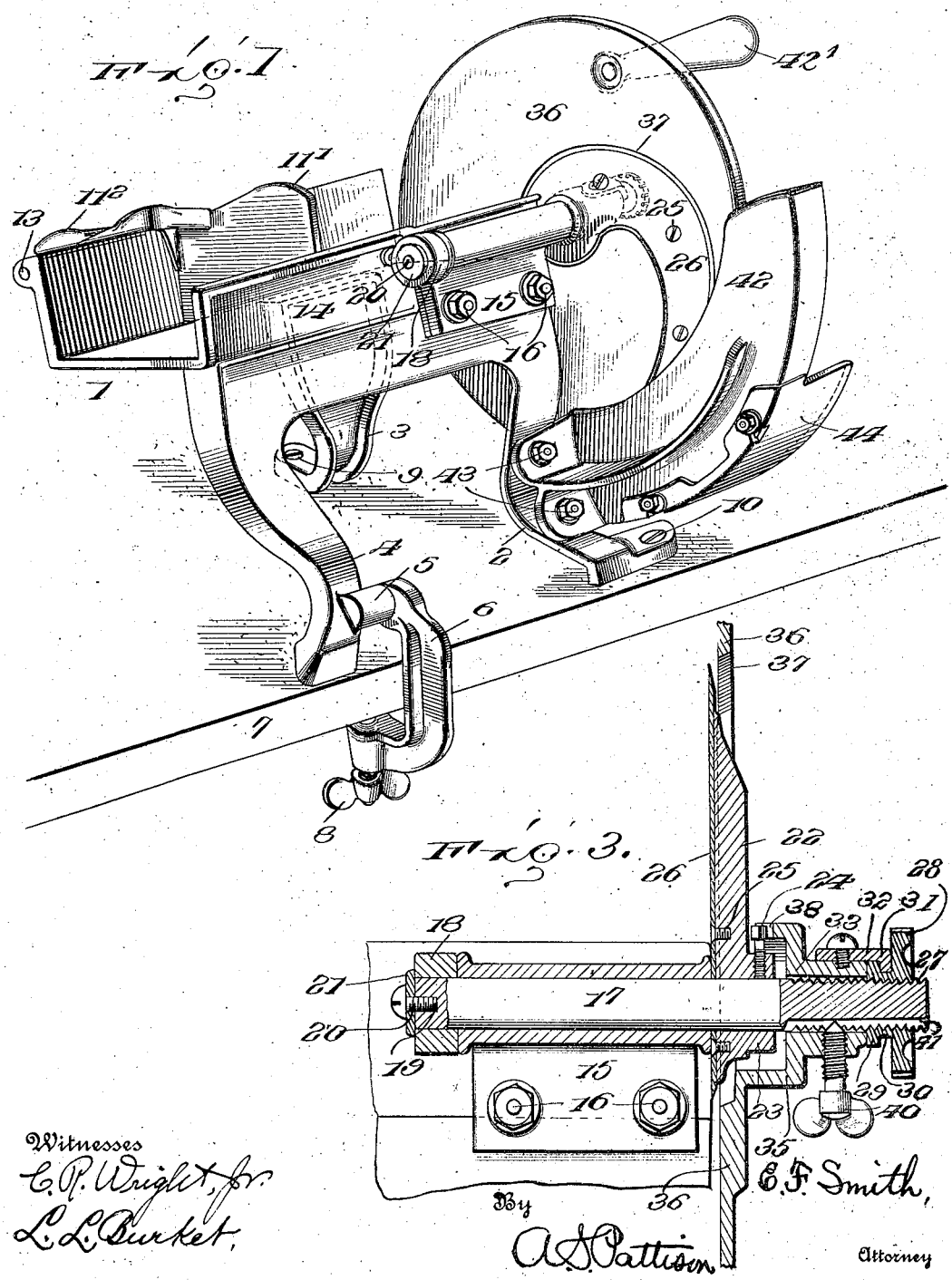

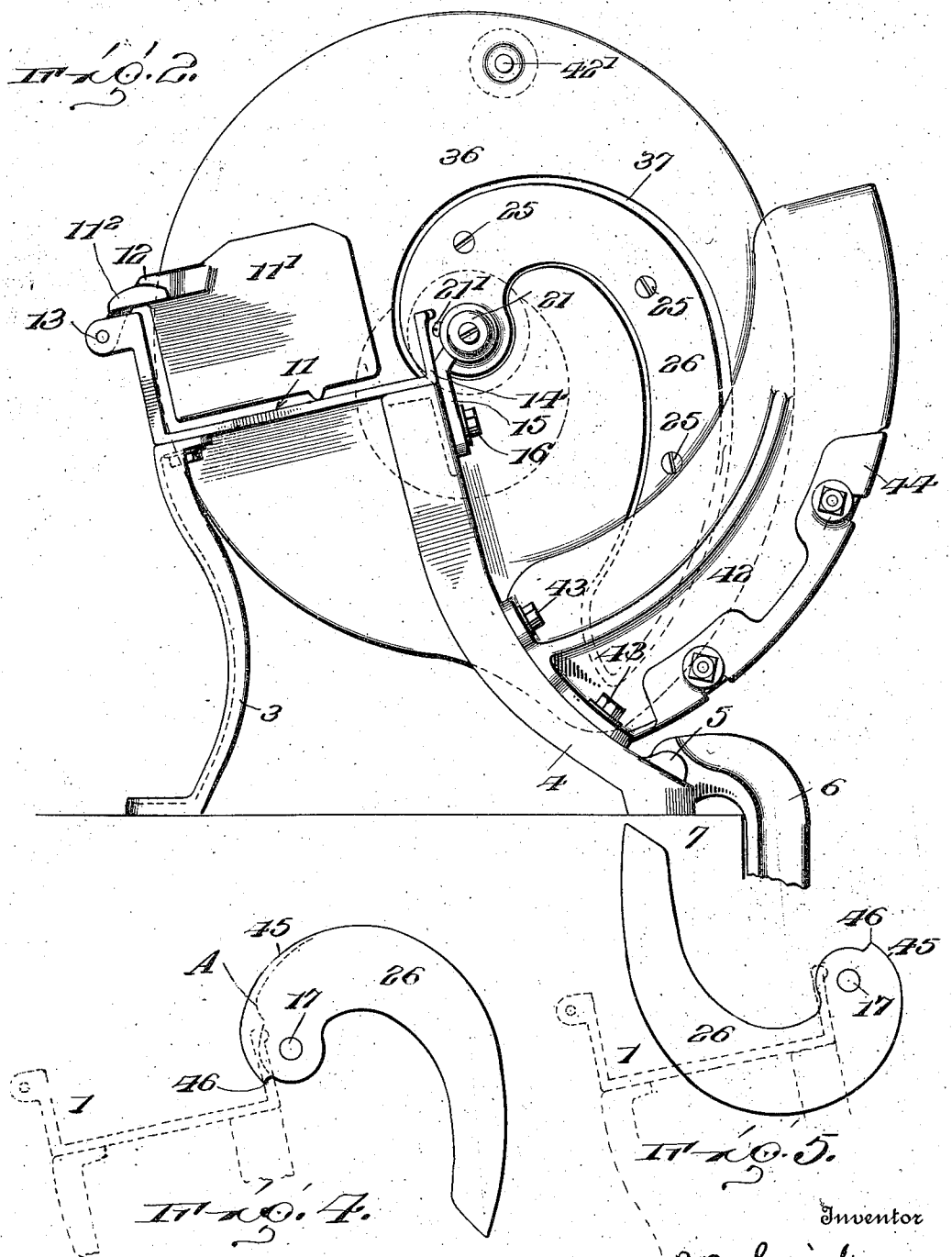

EDWARD F. SMITH, OF ROCHESTER, NEW YORK, ASSIGNOR TO JOSIAH ANSTICE, OF ROCHESTER, NEW YORK.

SLICING-MACHINE.

1,155,965.  Specification of Letters Patent.  Patented Oct. 5, 1915.

Application filed April 22, 1912. Serial No. 692,425.

*To all whom it may concern:*

Be it known that I, EDWARD F. SMITH, a citizen of the United States, residing at Rochester, in the county of Monroe and State of New York, have invented certain new and useful Improvements in Slicing-Machines, of which the following is a specification, reference being had therein to the accompanying drawing.

My invention relates to improvements in slicing machines.

An object of my invention is to provide a slicer of the character in which the guard or gage for varying the thickness of the slice may be readily adjusted to or from the blade, for varying the thickness of the slice, yet at the same time the blade is carried by the guard through the medium of the knife shaft.

A still further object of my invention is to provide a simple, cheap and more effective slicer having certain details of structure hereinafter fully set forth.

In the accompanying drawing, Figure 1 is a perspective view of my improved slicer clamped upon a table or shelf. Fig. 2 is an end view looking toward the right, Fig. 1. Fig. 3 is a longitudinal sectional view taken on the line of the knife shaft, showing the gage plate adjusting means. Fig. 4 is a side view of the knife showing the meat support in dotted lines and showing the position of the knife as it starts to cut. This view shows in dotted lines the common form of knife and approximately when it will start to cut. Fig. 5 is a view similar to Fig. 4, only showing the knife in its shearing cutting position.

Referring now to the drawings, 1 represents the meat support which is provided at one end by the legs 2 and 3, and at the opposite end by the lug 4. The lug 4 is provided with a horizontal stud 5, upon which is pivotally mounted the U-shaped clamp 6, which is adapted to straddle a table or shelf 7, and the lower end of said clamp is provided with a thumb screw 8, by means of which the machine may be readily clamped to the table. The legs 2 and 3 have their feet provided with openings and by means of the screws 9 and 10 the slicer is more securely fastened to the table, when desired.

The meat support, as clearly shown in the drawings, is set at an angle in order that the meat can be more readily held therein and at the same time bring the shearing surface 11 in such a position in respect to the knife that a better shear cut is made. Within the meat support is a feeder plate 11', which has a rearwardly and downwardly extending arm 12 carried by its rear edge and through which passes the rod 13 whereby the feeder plate may be readily moved longitudinally within the meat support and at the same time allowing the same to be swung upwardly so that the meat can be readily inserted in the support. The feeder plate, as heretofore stated, slides in the meat support and is adapted to slide freely therein by means of the handle $11^2$ and forces the meat forward toward the knife, as will be later more fully described.

The upper side wall 14 of the oblique meat support 1 is provided with an elongated shaft bearing 15, which is preferably bolted thereto by means of bolts 16. Mounted in said bearings is a shaft 17, which has a collar 18 on its outer end which bears against the end of the bearing. The outer end of the shaft is provided with a screw threaded opening 19 into which is screwed the machine screw 20, the head of which bears against a washer 21, said washer holding the collar 18 against the end of the bearing and wheleby the shaft is held against longitudinal movement to the right, as shown in Fig. 3.

Surrounding the shaft adjacent the opposite end of the bearing 15 is a casting 22, which is provided with an enlarged hub 23, and passing through said hub is a set-screw 24, which engages the shaft 17 and firmly locks the same upon the shaft. Screwed to the inner face of the casting 22, by means of the screws 25, is the blade 26, which is of the shape shown, and which will be hereinafter more fully described. The blade as shown is of a crescent form and has a spiral-shaped inner edge, whereby the knife has a side shearing action on the meat from the time it starts to cut.

The outer end of the shaft 17 is screw-threaded, as indicated at 27 and screwed thereon is a hand-wheel 28 having roughened outer edges whereby it may be readily screwed inwardly or outwardly on the shaft. The said hand-wheel has a hub portion 29 provided with a peripheral groove 30, into which extends the lug 31, carried by the plate 32. The plate 32 is secured upon the outer periphery of the hub 33, of the guard or gage-plate 36. This hub, as shown, is free to move longitudinally upon the shaft and by the turning of the hand wheel the gage plate is moved in or out. This hub is provided with the hollow portion 35, which is adapted to extend over the hub 23 and carries the gage plate proper 36. This plate is of a circular form having an opening 37 therein the same shape as that of the blade, only slightly larger so that there is a clearance space entirely surrounding the blade. The hollow portion of the hub 35 is provided with a notch 38 through which the set screw 24 extends and whereby the knife is adjusted on the shaft to or from the shearing surface 11, of the meat support. In order to hold the gage plate against rotation on the shaft 17, so that it will rotate with the knife-shaft, I provide a set-screw 40 which enters a longitudinal slot 41, in the screw-threaded portion of the shaft 17, and also holds the gage plate while moving from that adjustment.

The knife and casting being held by set-screw 24, it will be readily seen that the adjustment of the gage-plate 34 in or out by the hand-wheel 28 will vary the thickness of the slice.

Carried by the leg 2 is a guard plate 42 which is of a curved form and secured to the leg by means of the bolt 43. Bolted to the lower edge of the curved guard-plate 42 is a lateral curved plate 44, all of which is adapted to protect the knife and gage-plate as will be readily seen from the drawings.

The knife 26, as shown in Figs. 2, 4 and 5 is of an elongated curved form mounted at its inner end upon the shaft 17. The outer cutting edge 45 of the knife starts from the point 46, which is on the inside of the shaft 17 and extends spirally outwardly the spiral gradually increasing toward the outer end for causing a shearing action, as will be hereinafter more fully described.

The meat support 1 is set at an angle and the shaft 17 carrying the knife 26 is so located in respect thereto that as the gage-plate 36 carrying the knife 26 is revolved by means of the handle 42', the knife starts across the meat support and has a shearing action from the time of starting to cut, as clearly shown in Fig. 4 of the drawings. This specific form of knife and its location in respect to the meat support causes the knife to start to cut across the support at the lower end thereof so that a shearing cut is obtained and at the same time the knife is traveling downwardly, as shown in Fig. 5.

Fig. 4 of the drawings, shows the cutting edge of the old form of knife in dotted lines, the cutting portion starting at the point designated A, and thus it will be seen that when the knife starts to cut at the point A, it is at the upper end of the meat support and the cut is nearly straight down with little or no shearing action until point A has reached the shearing surface of the support. Thus the meat is not as evenly cut as it is with my form of blade where there is a combined sidewise and downward shearing cut from the moment the knife starts across the meat support.

Having thus described my invention, what I claim and desire to secure by Letters Patent is:

A meat slicer, comprising a meat support, a rotary shaft carried by said support, a knife mounted on said shaft and having an outwardly extending hub, a set screw passing through the hub and securing the knife on the shaft, a gage plate longitudinally adjustable on the shaft, a handle carried by the gage-plate, a hollow hub mounted upon the shaft and adapted to receive the knife hub and having a cut-away portion to expose the set-screw, a set screw carried by the hub and entering a longitudinal slot in the shaft to hold the same against rotation relatively to the shaft, but allowing it to freely slide thereon, a hand wheel screwed upon the outer end of the shaft and having a peripheral groove, and a member rigidly carried by the hub of the gage-plate and having a lateral lug entering the peripheral groove substantially as described.

In testimony whereof I hereunto affix my signature in the presence of two witnesses.

EDWARD F. SMITH.

Witnesses:

MOLLIE KERSUER,
JOSIAH AUSTIN.